US012034586B2

(12) United States Patent
Albero et al.

(10) Patent No.: US 12,034,586 B2
(45) Date of Patent: Jul. 9, 2024

(54) PRO-ACTIVE DIGITAL WATCH CENTER

(71) Applicant: Bank of America Corporation, Charlotte, NC (US)

(72) Inventors: George Albero, Charlotte, NC (US); Maharaj Mukherjee, Poughkeepsie, NY (US); Morgan S. Allen, Charlotte, NC (US); William August Stahlhut, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 54 days.

(21) Appl. No.: 17/851,151

(22) Filed: Jun. 28, 2022

(65) Prior Publication Data
US 2023/0421431 A1    Dec. 28, 2023

(51) Int. Cl.
*H04L 41/0654* (2022.01)
*H04L 41/0659* (2022.01)
*H04L 41/0677* (2022.01)
*H04L 41/16* (2022.01)

(52) U.S. Cl.
CPC ...... *H04L 41/0654* (2013.01); *H04L 41/0659* (2013.01); *H04L 41/0677* (2013.01); *H04L 41/16* (2013.01)

(58) Field of Classification Search
CPC . H04L 41/0654; H04L 41/1621; H04L 41/16; H04L 41/14; H04L 41/147; H04L 41/149; H04L 41/0659; H04L 41/0677
See application file for complete search history.

(56) References Cited

U.S. PATENT DOCUMENTS

| | | | | |
|---|---|---|---|---|
| 2005/0099953 | A1* | 5/2005 | MacDonald | H04L 41/0659 370/241 |
| 2009/0073988 | A1* | 3/2009 | Ghodrat | H04L 45/22 370/395.53 |
| 2014/0078882 | A1* | 3/2014 | Maltz | H04L 41/0654 370/216 |
| 2017/0148224 | A1* | 5/2017 | Alvarez | G06T 19/20 |
| 2019/0379577 | A1* | 12/2019 | Tiwari | H04L 41/0654 |
| 2020/0089586 | A1* | 3/2020 | Wong | H04L 41/5019 |
| 2020/0167177 | A1* | 5/2020 | Mahajan | H04L 9/30 |
| 2021/0105173 | A1* | 4/2021 | Gerstel | H04L 41/0654 |
| 2021/0226853 | A1* | 7/2021 | Karikallio | H04L 41/0654 |
| 2022/0038348 | A1* | 2/2022 | Mayor | H04L 41/0654 |
| 2022/0086034 | A1* | 3/2022 | Kolhekar | H04L 41/0654 |
| 2022/0166691 | A1* | 5/2022 | Johnson | H04L 43/024 |
| 2022/0345356 | A1* | 10/2022 | Triplet | H04L 41/0654 |
| 2023/0032264 | A1* | 2/2023 | Song | H04L 41/0654 |
| 2023/0053044 | A1* | 2/2023 | Wang | H04L 41/0631 |
| 2023/0080679 | A1* | 3/2023 | Koral | H04W 76/18 |

* cited by examiner

*Primary Examiner* — Nam T Tran
(74) *Attorney, Agent, or Firm* — Weiss & Arons LLP (57) ABSTRACT

A computer system for optimizing an application for monitoring operation of a network is provided. The application may utilize Artificial Intelligence (AI). The computer system may be configured to detect a network transaction volume level that exceeds a first threshold level. In response to a detection of the network transaction volume level that exceeds a first threshold level, the system may utilize the AI to determine whether to implement one or more over-threshold-level mitigation techniques. When the AI instructs the processor to implement the one or more over-threshold-level mitigation techniques, the system may query the AI for an instruction directing an implementation of the over-threshold-level mitigation techniques.

18 Claims, 8 Drawing Sheets

PRO-ACTIVE DIGITAL WATCH CENTER

FIELD OF TECHNOLOGY

Aspects of the disclosure relate to artificial intelligence (AI.) More specifically, aspects of this disclosure relate to AI techniques for use in bandwidth preservation and augmentation in network settings.

BACKGROUND OF THE DISCLOSURE

Networked environments are dynamic. Conditions, inputs and outputs, as well as constraints on the environment, constantly change.

Yet changes to the environment often reflect historical fluctuations.

In view of the foregoing, it would be desirable for a system that views/watches/monitors a networked environment for changing conditions.

It would be further desirable for such a system to identify AI, and Machine Learning (ML) based opportunities and improvements to the system based, at least in part on legacy system operations.

SUMMARY OF THE DISCLOSURE

One aspect of the system according to the disclosure views/watches/monitors a networked environment for changing conditions.

Another aspect of the system according to the disclosure identifies AI and Machine Learning (ML) based opportunities and improvements to the system based, at least in part on legacy system operations.

A system that optimizes an application for monitoring operation of a network is provided. The application uses Artificial Intelligence (AI). A processor at work in such a system may be configured to detect a transmission condition of the network that exceeds a first threshold level. In response to a detection of the transmission condition of the network that exceeds a first threshold level, the system may utilize the AI to determine whether to implement one or more over-threshold-level mitigation techniques. When the AI instructs the processor to implement the one or more over-threshold-level mitigation techniques, the system may query the AI for an instruction directing an implementation of the over-threshold-level mitigation techniques.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Certain embodiments of the disclosure may involve an application using a processor. The processor may be used to optimize an application for monitoring operation of a network. The processor may detect one or more anomalies in the operation of the network. In response to a detection of the one or more anomalies in the operation of the network, the processor may utilize the AI to determine whether to implement one or more anomaly mitigation techniques. When the AI instructs the processor to implement the one or more anomaly mitigation techniques, the processor may query the AI for a plurality of instructions directing an implementation of the anomaly (or over-threshold-level) mitigation techniques. It should be noted that, when the AI is co-located, or forms part of, the application, the AI can continue to learn from all the various operational states and occurrences through which the application operates.

The plurality of instructions may be configured to pre-provision a creation of one or more virtual machines to mitigate the one or more anomalies. The anomaly mitigation techniques may include one or more self-healing algorithms. The self-healing algorithms may be configured to pre-provision a creation of one or more virtual machines to mitigate the one or more anomalies.

The self-healing algorithms may be configured to install a virtual infrastructure to mitigate the one or more anomalies.

The self-healing algorithms may be configured to spawn a copy of a virtual infrastructure resource in order to mitigate the one or more anomalies. It should be noted that, in some embodiments, the spawned virtual infrastructure resource may be configured to match an existing resource. It should be noted further that the communication pathways to the existing resource may also be spawned such that the existence, operation and connections of the virtual resource substantially map on the operation and connections of the existing resource.

In some embodiments, an AI determination whether to implement one or more anomaly mitigation techniques may be based on predictive input generated by the AI. The predictive input may relate to the one or more anomalies in the operation of the network.

An AI determination whether to implement one or more anomaly mitigation techniques may, in some embodiments, be based on predictive input generated by the AI. The predictive input may relate to the one or more anomaly mitigation techniques.

An AI determination whether to implement one or more anomaly mitigation techniques may, in other or the same embodiments, be based on predictive input generated by the AI. The predictive input may identify future network bandwidth reduction locations and/or conditions.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
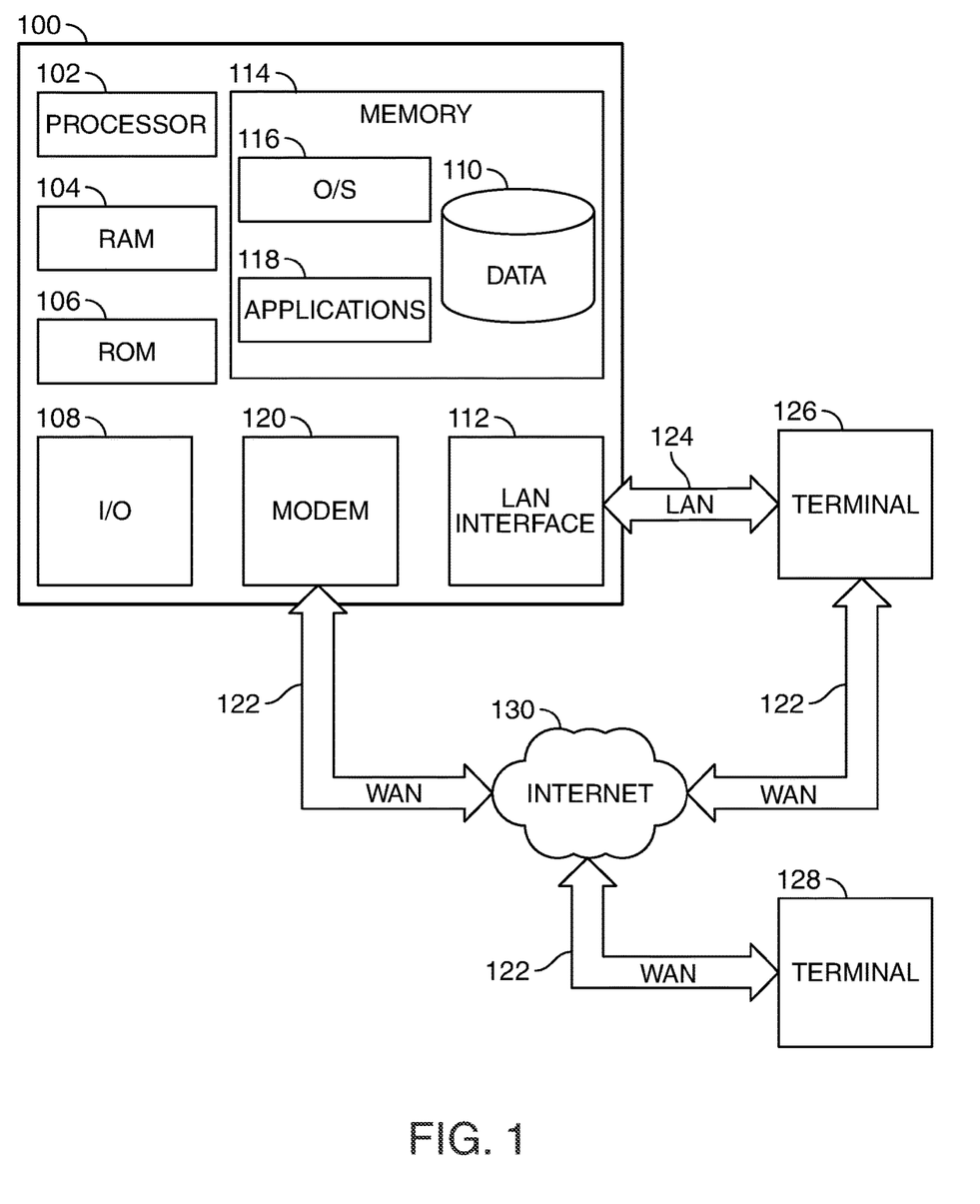
FIG. 1 shows an illustrative block diagram of system that may be configured in accordance with the principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI) as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
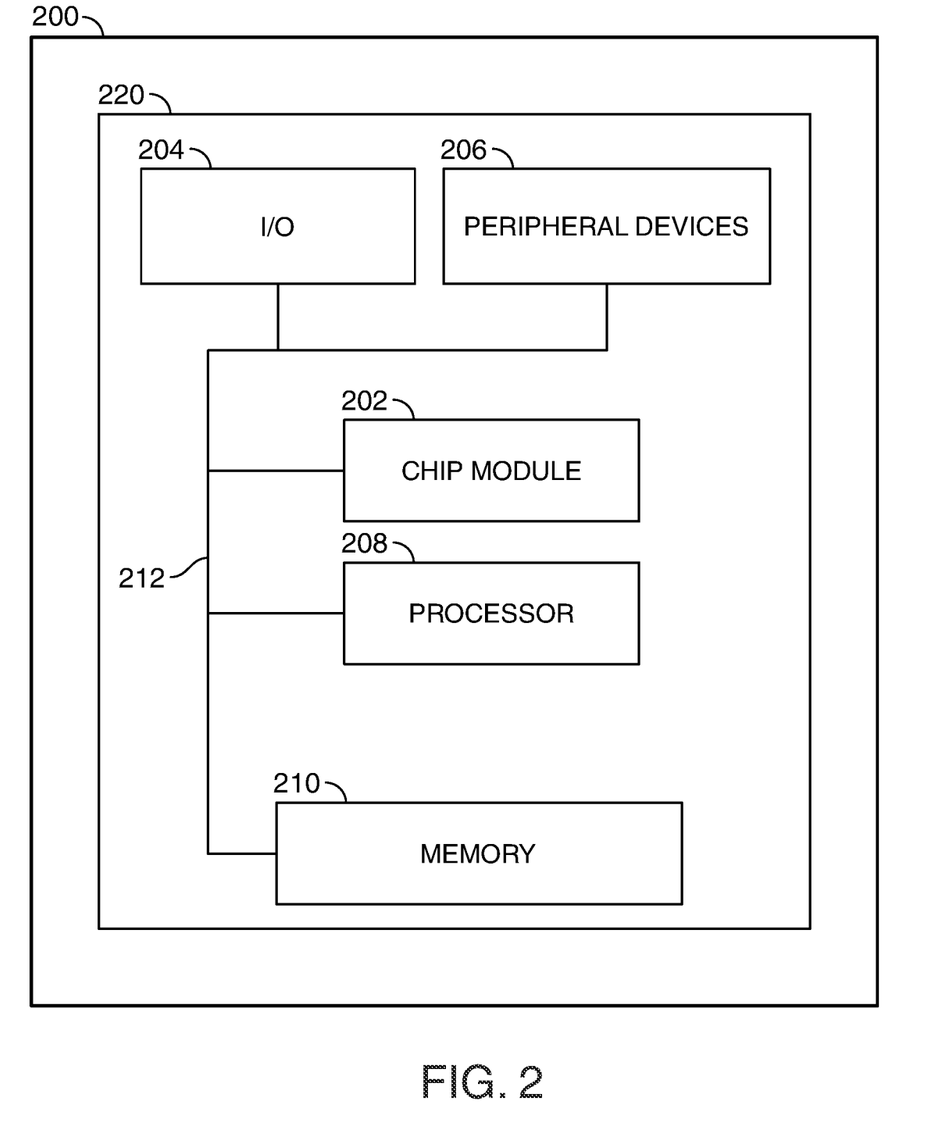
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
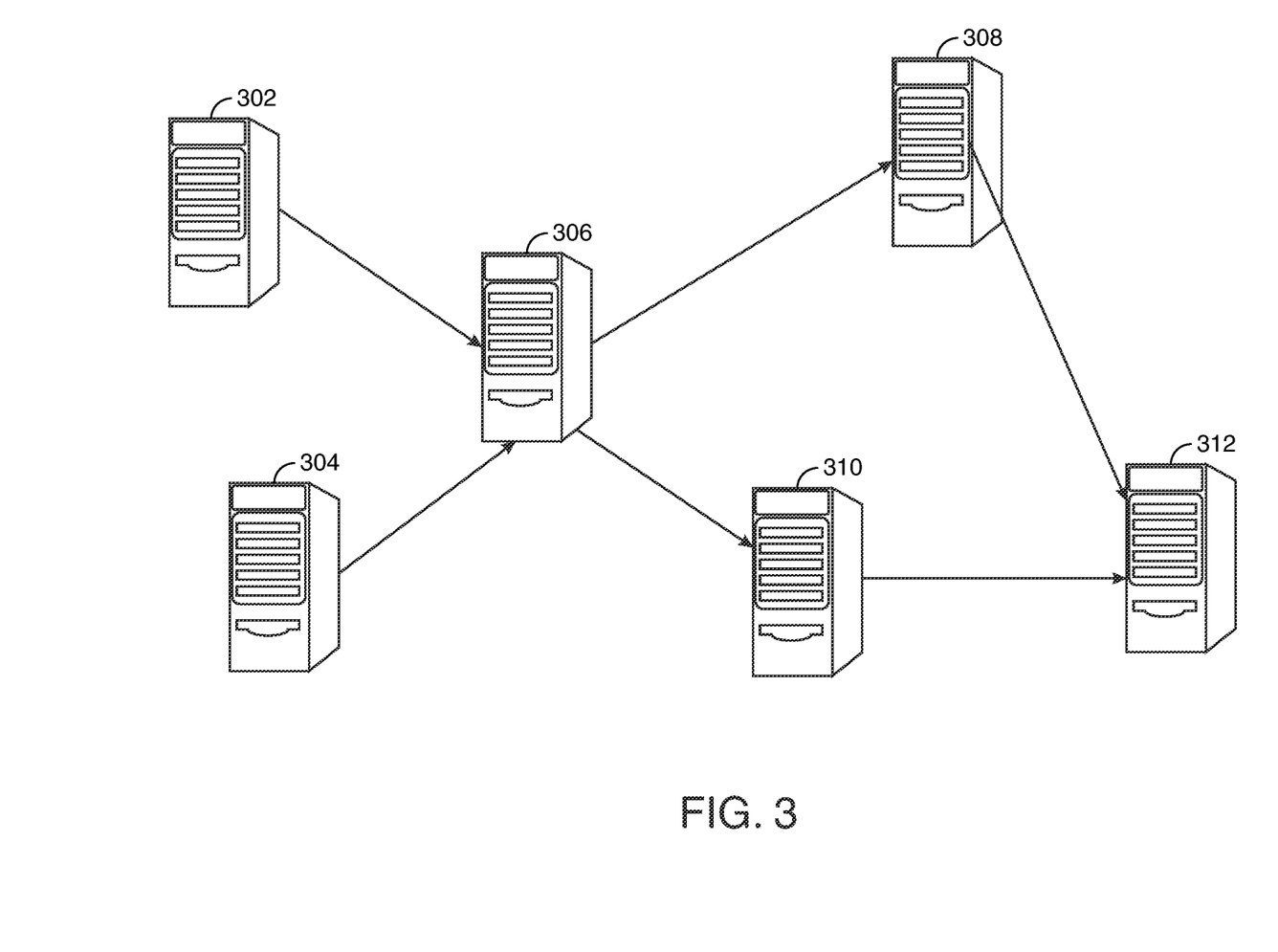
FIG. 3 shows a schematic diagram of a network of servers.

FIG. 3 shows a schematic diagram of a network of servers 302, 304, 306, 308, 310 and 312. It should be noted that various electronic communication pathways couple the servers to one another. These servers can be used, for example, in a communications network.

Figure 4:
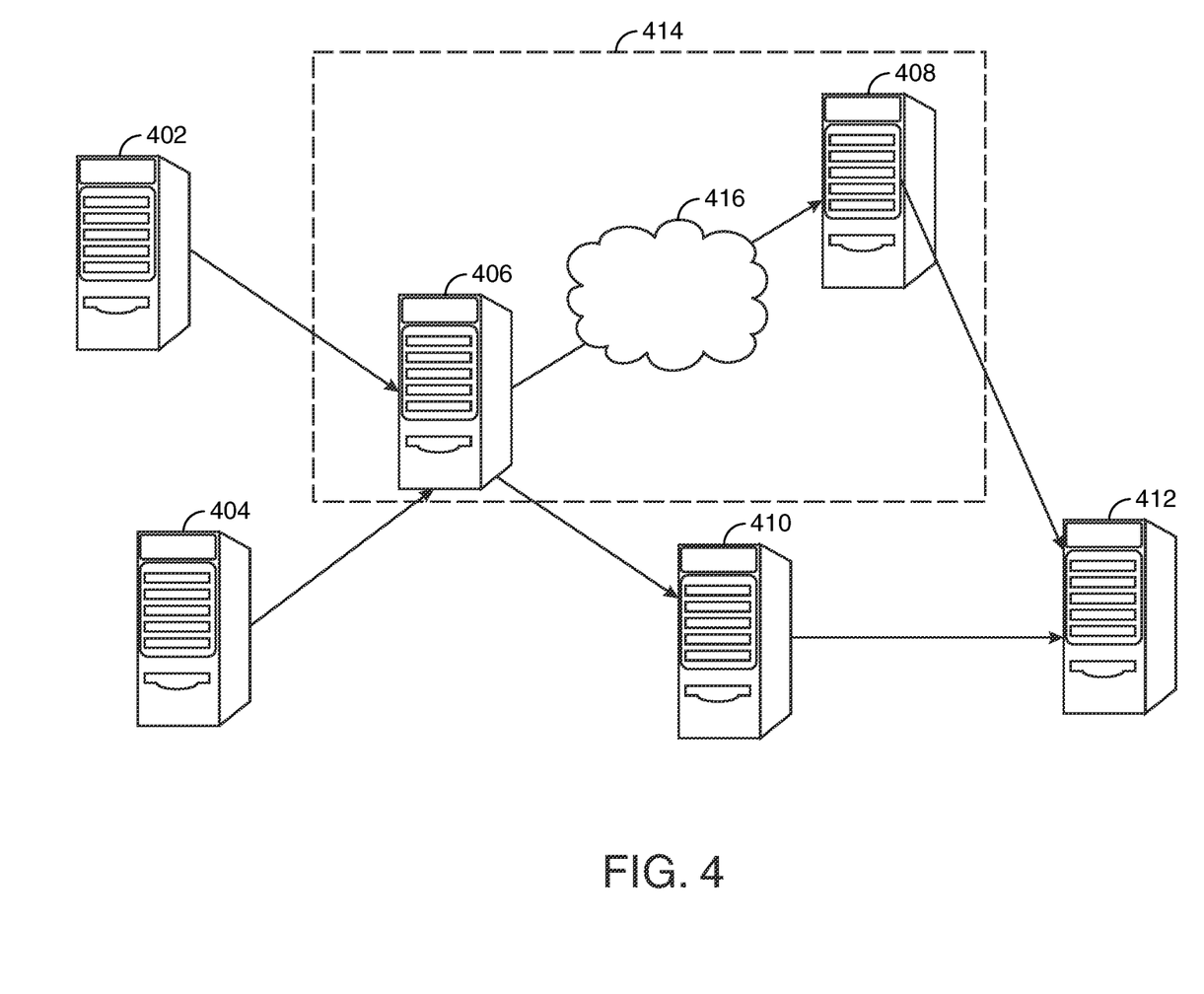
FIG. 4 shows another schematic diagram of a network of servers.

FIG. 4 shows a schematic diagram of a network of servers 402, 404, 406, 408, 410 and 412. Network region 414 is also shown.

Network region 414 includes forecasted or actual bandwidth bottleneck area 416. Bottleneck area 416 may signify an area of restricted, or overstressed, network connection(s). It would be advantageous to be able to determine and/or isolate such an area during network operation. It may also be advantageous to predict, through use of AI or Machine Learning (ML), the future occurrence, or possibility of occurrence, of such a restricted, or overstressed, network connection.

In such circumstances of the occurrence of, or prediction of, restricted, or overstressed, network connections it would be advantageous to provide an algorithm that triggers a mitigation response during or prior to the occurrence of restricted, or overstressed, network connection.

Figure 5:
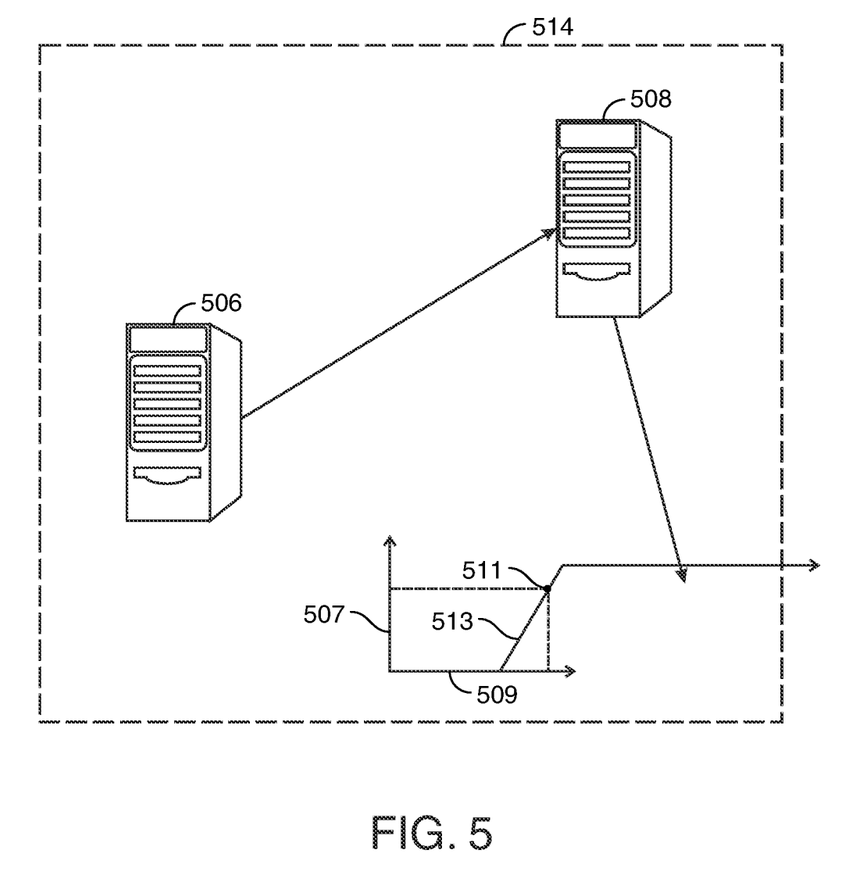
FIG. 5 shows a network region including one or more restricted, or overstressed, network connection(s)

FIG. 5 shows network region 514 including one or more restricted, or overstressed, network connection(s). The chart at the bottom of FIG. 5 shows a schematic approach to an algorithm that may be implemented to trigger a network response to such a restricted, or overstressed, network connection.

Specifically, FIG. 5 shows a schematic diagram including an x-axis 509 that maps against time and a y-axis 507 that maps against one or more network traffic conditions. Line 513 signifies rising network traffic to a plateau. Point 511 signifies a time condition along the x-axis 509, a level of network traffic condition along the y-axis 509 and a point along line 513 that indicates a trigger point for a network traffic mitigation response.

Figure 6:
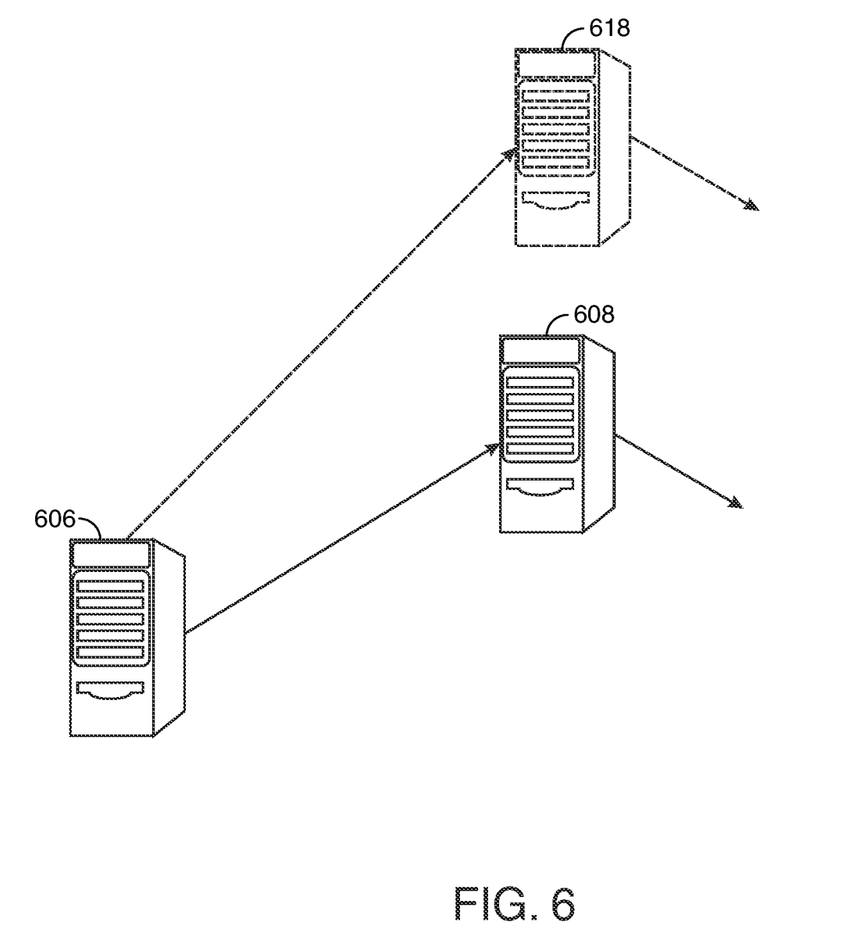
FIG. 6 shows a schematic diagram of a possible mitigation response to a determination of, inter alia, a current or future greater than threshold network traffic condition.

FIG. 6 shows a schematic diagram of a possible mitigation response to a determination of, inter alia, a current or future greater than threshold network traffic condition. In FIG. 6, a current or future greater than threshold network traffic condition was detected in the communication pathway between server 606 and 608. It should be noted that a determination of the threshold may be associated with a level of network traffic that may serve to overstress, and possibly disable, a server and/or a communications pathway. One possible mitigation response is shown using virtual or real server 618.

FIG. 6 shows spawning, upon detection of the current or future greater than threshold network traffic condition, communication pathways and additional server 618. The communication pathways and additional server 618 may, in certain circumstances, be identical to server 608 and its communication pathways. As such, a bandwidth and communications transmission load that previously devolved only through server 608 can be routed at least partially through server 618. The final implementation of such a solution may require a load balancer, or other suitable hardware, located at or near server 606, for splitting the load between the legacy server 608 and the mitigation server 618. The final implementation of such a solution may require a load balancer, or other suitable hardware, located at or a server that receives communications signals from servers 608 and mitigation 618, for splitting the received load from legacy server 608 and mitigation server 618.

Figure 7:
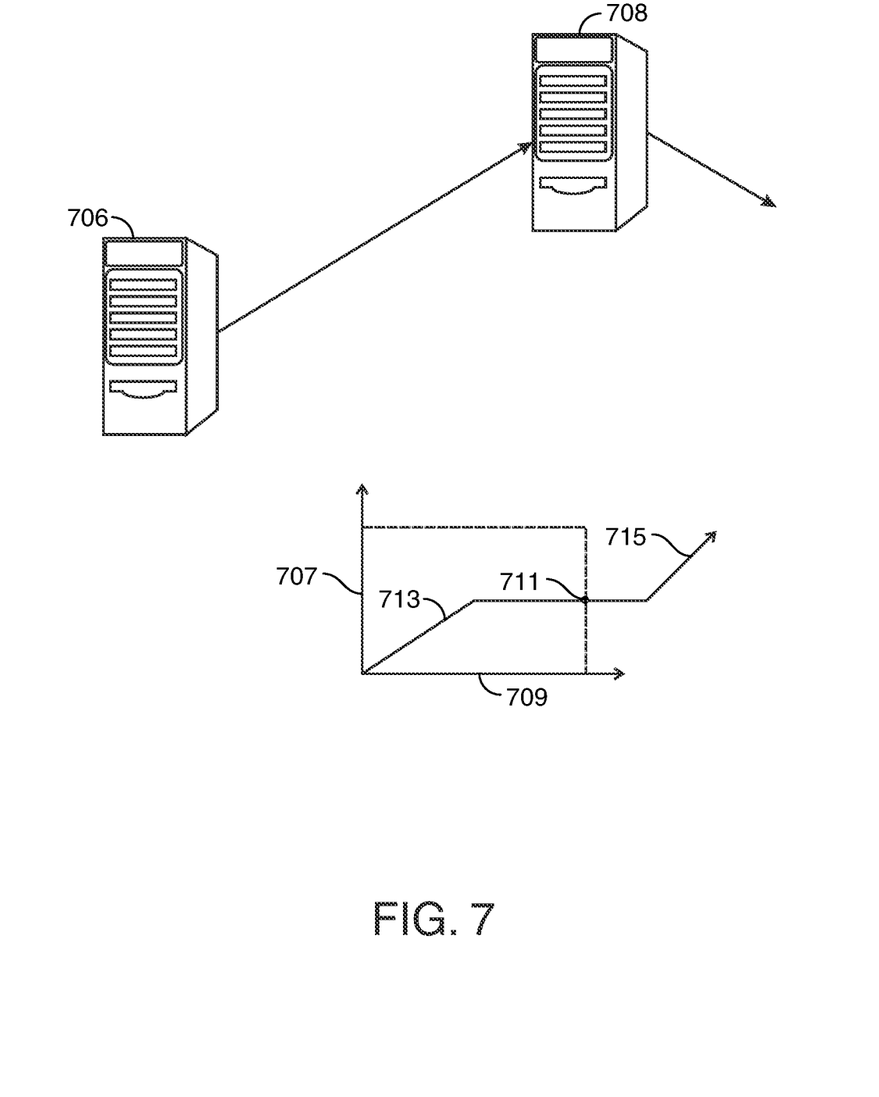
FIG. 7 shows a schematic diagram including an x-axis that maps against time and a y-axis that maps against one or more network traffic conditions.

FIG. 7 shows a schematic diagram including an x-axis 709 that maps against time and a y-axis 707 that maps against one or more network traffic conditions. Line 713 signifies rising network traffic to a plateau. Point 711 signifies a time condition along the x-axis 709, a level of network traffic condition along the y-axis 709 and a point along line 713 that indicates a trigger point for a network traffic mitigation response.

It should be noted that, unlike FIG. 5, the trigger point 711 that calls for a network traffic mitigation response may be in response to an instruction from an AI engine. Such an instruction from an AI engine may indicate that a future level of network traffic may be sufficient to trigger a current response to the future level. The future level AI determination may be based on historical information regarding past network traffic behavior. Moving the time of response forward—i.e., before the actual occurrence of the level of network traffic—may enable the system to spawn the real or virtual server, and associated communication pathways, prior to the onset of the actual condition. This may avoid future interruptions in the system.

Figure 8:
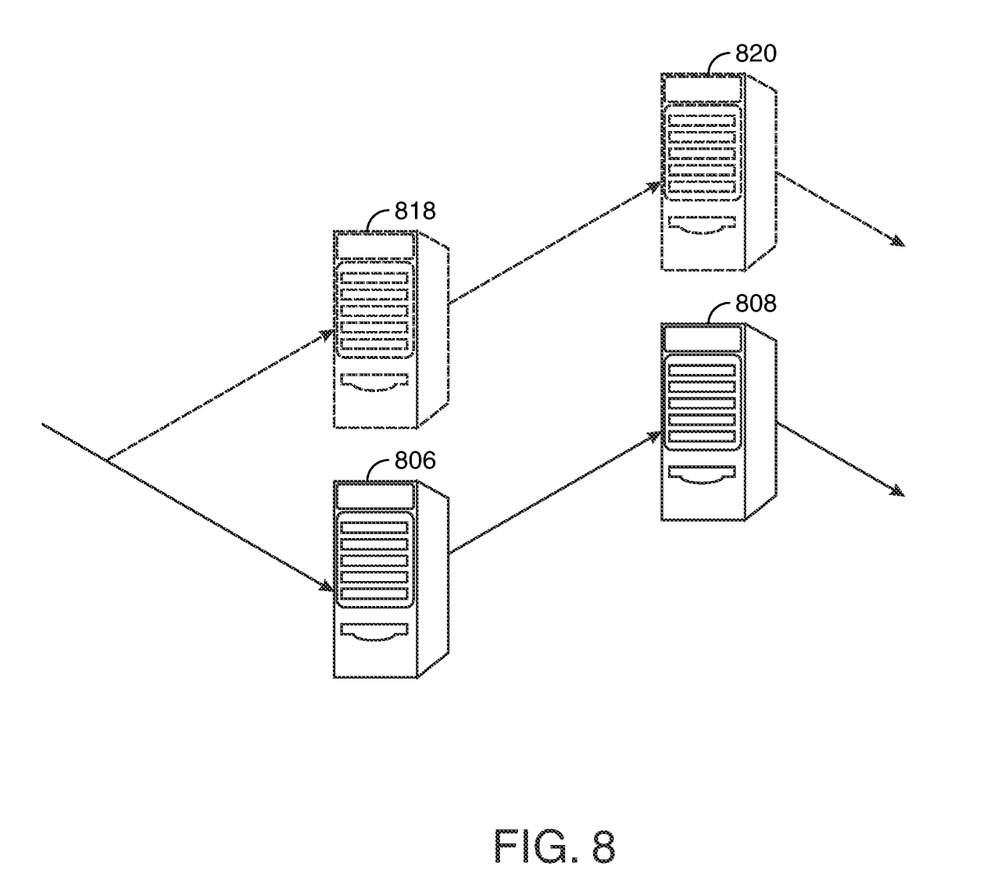
FIG. 8 shows multiple servers that can be used for over traffic, or other network, conditions.

FIG. 8 shows multiple servers 806 and 808 that can be used for over-threshold-traffic, or other network, conditions. The algorithms shown schematically in FIGS. 5 and 7 may be used to spawn one or more virtual and/or real servers 818 and 820. The algorithms shown schematically in FIGS. 5 and 7 may be used to spawn one or more communication pathways to and from virtual and/or real servers 818 and 820. It should be noted servers 818 and 820 may be used to share, or in some embodiments, completely assume, the load to and from servers 806 and 808. It should be noted that in the embodiments in which servers 818 and 820 completely assume the load to and from servers 806 and 808, servers 818 and 820 may be spawned to a capacity different from, and possibly greater than, servers 806 and 808. In such embodiments, servers 818 and 820 may be enabled such that no server function additional to the server function of servers 818 and 820 may be necessary to help with the bandwidth and communications traffic directed towards servers 806 and 808.

Thus, systems and methods related to PRO-ACTIVE DIGITAL WATCH CENTER are provided. Persons skilled in the art will appreciate that the present invention can be practiced by other than the described embodiments, which are presented for purposes of illustration rather than of limitation. The present invention is limited only by the claims that follow.

What is claimed is:

1. One or more, non-transitory, computer-readable media storing computer-executable instructions which, when executed by a processor on a computer system, optimize an application for monitoring operation a network, said application utilizing Artificial Intelligence (AI), said processor configured to:
   detect one or more anomalies in the operation of the network, said one or more anomalies comprising a determination of a greater than threshold traffic condition within a communication pathway of the network;
   in response to a detection of the one or more anomalies, isolate a bottleneck area, said bottleneck area associated with the one or more anomalies, during the operation of the network;
   in response to a detection of the one or more anomalies in the operation of the network, utilize the AI to determine whether to implement one or more anomaly mitigation techniques; and
   when the AI instructs the processor to implement the one or more anomaly mitigation techniques, query the AI for a plurality of instructions directing an implementation of the anomaly mitigation techniques; and
   wherein said anomaly mitigation techniques comprise one or more self-healing algorithms, the self-healing algorithms that are configured to spawn a copy of a virtual infrastructure network in order to mitigate the one or more anomalies, said virtual infrastructure network comprising an entirely virtual communication path;
   in response to using one or more self-healing algorithms to spawn a copy of the virtual infrastructure network, using a load balancer to split up communications between the network and the virtual infrastructure network.

2. The media of claim 1, wherein the plurality of instructions is configured to pre-provision a creation of one or more virtual machines to mitigate the one or more anomalies.

3. The media of claim 1, wherein said anomaly mitigation techniques comprise one or more self-healing algorithms, the self-healing algorithms that are configured to pre-provision a creation of one or more virtual machines to mitigate the one or more anomalies.

4. The media of claim 1, wherein said anomaly mitigation techniques comprise one or more self-healing algorithms, the self-healing algorithms that are configured to install a virtual infrastructure to mitigate the one or more anomalies.

5. The media of claim 1, wherein an AI determination whether to implement one or more anomaly mitigation techniques is based on predictive input generated by the AI, said predictive input relating to the one or more anomalies in the operation of the network.

6. The media of claim 1, wherein an AI determination whether to implement one or more anomaly mitigation techniques is based on predictive input generated by the AI, said predictive input relating to the one or more one or more anomaly mitigation techniques.

7. The media of claim 1, wherein an AI determination whether to implement one or more anomaly mitigation techniques is based on predictive input generated by the AI, said predictive input that identifies future network bandwidth reduction locations and/or conditions.

8. One or more, non-transitory, computer-readable media storing computer-executable instructions which, when executed by a processor on a computer system, optimize an application for monitoring operation a network, said application utilizing Artificial Intelligence (AI), said processor configured to:
   detect a transmission condition of the network that exceeds a first threshold level;
   in response to a detection of the transmission condition, isolate a bottleneck area, said bottleneck area associated with the detection of the transmission condition, during operation of the network;
   in response to a detection of the transmission condition of the network that exceeds a first threshold level, utilize the AI to determine whether to implement one or more over-threshold-level mitigation techniques;
   when the AI instructs the processor to implement the one or more over-threshold-level mitigation techniques, query the AI for an instruction directing an implementation of the over-threshold-level mitigation techniques; and
   wherein said over-threshold mitigation techniques comprise one or more self-healing algorithms, the self-healing algorithms that are configured to spawn a copy of a virtual infrastructure network in order to mitigate the transmission condition, said virtual infrastructure network comprising an entirely virtual communication path;

in response to using the one or more self-healing algorithms to spawn a copy of the virtual infrastructure network, using a load balancer to split transmission between the network and the virtual infrastructure network.

9. The media of claim 8, wherein the instruction is configured to pre-provision a creation of one or more virtual machines to mitigate the transmission condition that exceeds the first threshold.

10. The media of claim 8, wherein said over-threshold-level mitigation techniques comprise one or more self-healing algorithms, the self-healing algorithms that are configured to pre-provision a creation of one or more virtual machines to mitigate the transmission condition that exceeds the first threshold.

11. The media of claim 8, wherein said over-threshold-level mitigation techniques comprise one or more self-healing algorithms, the self-healing algorithms that are configured to install a virtual infrastructure to mitigate the transmission condition that exceeds the first threshold.

12. The media of claim 8, wherein an AI determination whether to implement one or more anomaly mitigation techniques is based on predictive input generated by the AI, said predictive input relating to the transmission condition that exceeds the first threshold.

13. The media of claim 8, wherein an AI determination whether to implement one or more anomaly mitigation techniques is based on predictive input generated by the AI, said predictive input relating to forecasting the transmission condition that exceeds the first threshold.

14. The media of claim 8, wherein an AI determination whether to implement one or more anomaly mitigation techniques is based on predictive input relating to forecasting the transmission condition that exceeds the first threshold, said predictive input that identifies future network bandwidth reduction locations and/or conditions.

15. One or more, non-transitory, computer-readable media storing computer-executable instructions which, when executed by a processor on a computer system, optimize an application for monitoring operation of an electronic communications network, said application utilizing Artificial Intelligence (AI), said processor configured to:
   detect a network transaction volume level that exceeds a first threshold level;
   in response to a detection of a network transaction volume level, isolate a bottleneck area, said bottleneck area associated with the network transaction volume level that exceeds the first threshold level, during operation of the network;
   in response to a detection of the network transaction volume level that exceeds a first threshold level, utilize the AI to determine whether to implement one or more over-threshold-level mitigation techniques;
   when the AI instructs the processor to implement the one or more over-threshold-level mitigation techniques, query the AI for an instruction directing an implementation of the over-threshold-level mitigation techniques; and
   in response to the query to the AI for an instruction, directing an implementation of the over-threshold-level mitigation techniques;
   spawning a copy of the network; and
   routing communication between the network and the copy of the network.

16. The media of claim 15, wherein the instruction is configured to pre-provision a creation of one or more virtual machines to mitigate the network transaction volume level that exceeds the first threshold.

17. The media of claim 15, wherein said over-threshold-level mitigation techniques comprise one or more self-healing algorithms, the self-healing algorithms that are configured to pre-provision a creation of one or more virtual machines to mitigate the network transaction volume level that exceeds the first threshold.

18. The media of claim 15, wherein an AI determination whether to implement one or more over-threshold-level mitigation techniques is based on predictive input generated by the AI, said predictive input relating to the network transaction volume level that exceeds the first threshold.

* * * * *